April 28, 1959     R. W. JENSEN     2,884,003
MODULATING AND SHUTOFF VALVE
Filed Feb. 20, 1956
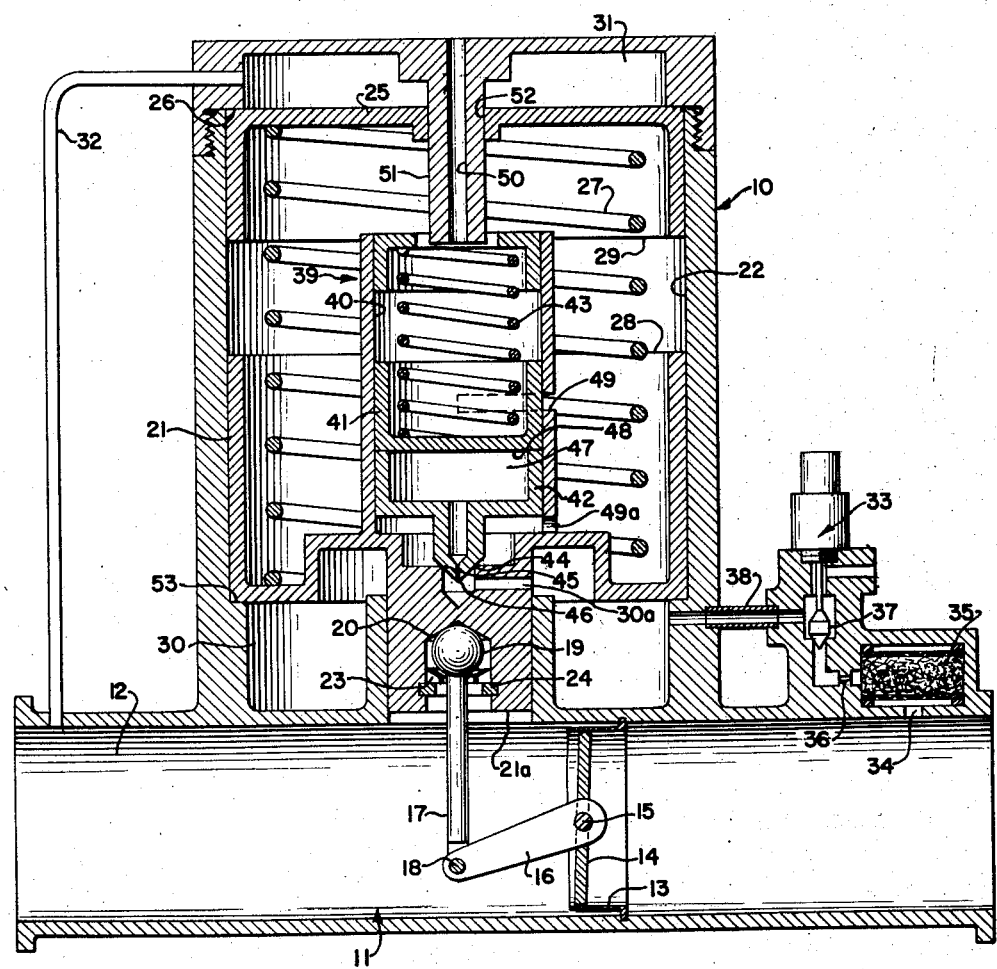
RAYMOND W. JENSEN,
INVENTOR.
BY

United States Patent Office 2,884,003
Patented Apr. 28, 1959

2,884,003

MODULATING AND SHUTOFF VALVE

Raymond W. Jensen, Phoenix, Ariz., assignor to The Garrett Corporation, Los Angeles, Calif., a corporation of California Application February 20, 1956, Serial No. 566,723

14 Claims. (Cl. 137—495)

This invention relates to a modulating and shutoff valve; more particularly, to a valve having a novel arrangement of a spring tending to hold a valve member in a predetermined position and means which automatically renders the spring totally inoperative when modulating operation of the valve is initiated.

Heretofore various valves, including pressure regulating and shutoff valve elements, have employed pressure responsive movable walls to accomplish flow modulating operation of valve elements. In addition, such valves have utilized a spring which continually exerts force against the valve element tending to move the same toward a closed position. In the operation of a spring biased modulating valve, the force of the spring must be overcome in the movement of the valve toward an open position and the rate of the spring force must automatically be compensated. In some pressure regulating and shutoff valves, certain spring characteristics may permit hunting of the modulating valve element.

Accordingly, it is an object of the present invention to provide means producing a force which tends to hold a valve element closed and which is automatically rendered totally inoperative during modulating action of the valve element.

Another object of the invention is to provide a modulating and shutoff valve in which a valve element is controlled in accordance with a differential between a reference pressure and pressure downstream of the valve element, the valve element being free to respond directly to said pressure differential without the necessity of overcoming spring force or compensating for spring rate.

Another object of the invention is to provide a modulating and shutoff valve construction which is particularly adapted for operation under high temperature and high pressure conditions.

Another object of the invention is to provide a modulating and shutoff valve having novel means for automatically nullifying the normal tendency of a spring to close the valve when it is modulating to control pressure downstream thereof.

Further objects and advantages of the present invention will be apparent from the following specification, appended claims and accompanying drawings, in which:

The figure of the drawing is an axial sectional view of a valve showing diagrammatically the operating features of the invention.

As shown in the drawing, the pressure regulating and shutoff valve, according to the present invention, is provided with a housing 10 having a passage means 11 in connection therewith. This means 11 is provided with a passage 12 having a resilient sleeve 13 disposed therein. Engageable internally with the resilient sleeve 13 is a butterfly valve 14 which is secured for pivotal movement with a pin 15. Secured to the pin 15 is a bell crank 16 having a link 17 pivotally connected therewith by means of a pin 18.

The link 17 is provided with a spherical end 19 disposed in a socket 20 formed in a piston 21 which is reciprocally mounted in a bore 22 of the housing 10. The spheroid 19 is retained in the socket 20 by a bushing 23 and snap ring 24. This arrangement provides for angular freedom of the link 17 during arcuate travel of the pin 18 about the axis of the pin 15 during actuation of the valve element 14.

Reciprocally mounted in the bore 22 is a second piston 25 formed for engagement with a shoulder 26 which limits movement of the piston 25 in a direction away from the piston 21. A spring 27 interposed between the pistons 21 and 25 tends to force them apart causing the piston 25 to engage the shoulder 26 and piston 21 to move butterfly valve 14 to closed position as shown in the drawing. The pistons 21 and 25 are provided with abutment portions 28 and 29 respectively, which are engaged with each other during modulating operation of the valve, as will be hereinafter described in detail.

The housing 10 is provided with chambers 30 and 31 which are open at one side to the pistons 21 and 25, respectively. Chambers 30 and 31 are adapted to receive fluid under pressures and apply such pressures to the pistons 21 and 25, the pressures tending to force the pistons together and cause engagement thereof at their abutment portions 28 and 29. Such action causes compression of the spring 27 between the pistons 21 and 25 and renders the spring inoperative.

The chamber 30 communicates with a source of control pressure, in this instance, the passage 12 at the inlet side of valve 14, while the chamber 31, by means of a tube 32, communicates with the passage 12 downstream of the valve element 14. Communicating with the chamber 30 is a pilot valve 33. This pilot valve 33 is a solenoid shutoff valve having an inlet 34 which communicates with the passage bore 12 upstream of the valve element 14. A filter 35 in advance of the pilot valve 33 is adapted to remove deleterious matter from air entering the opening 34 from the passage bore 12. A restricted orifice 36 is positioned at the outlet of the filter 35 and communicates with a solenoid operated shutoff valve element 37 of the pilot valve which, when open, permits direct communication of the restricted orifice 36 with the chamber 30 via a tube 38.

A bleedoff pressure regulator 39 is mounted in the piston 21 for regulating control or reference pressure in the control chamber 30. This bleedoff pressure regulator comprises a cylinder 40, formed in connection with the piston 21, wherein a pressure regulating piston 41 and poppet valve piston 42 are reciprocally mounted. A spring 43 in the cylinder 40 engages the pressure regulating piston 41 and normally tends to force the piston 41 to engage the piston 42 and also force it in a direction toward the socket 20. The poppet piston 42 is provided with a poppet valve element 44 disposed for engagement with seat 45 at one end of a passage 30a communicating with the chamber 30. Centrally of the poppet portion 44 is a restricted orifice 46 which establishes limited communication between the passage 30a and chamber 47 in the poppet piston 42. This chamber 47 communicates directly with the pressure regulating piston 41, whereby pressure in this chamber acts on the piston 41, tending to move it in opposition to the spring 43 and cause the end 48 of the pressure regulating piston 41 to uncover an opening 49 in the wall 40 of the bleedoff pressure regulator 39. When piston 41 starts to uncover opening 49, fluid pressure will escape from chamber 47 to the interior of piston 21. Sufficient movement of piston 41 will allow enough pressure to escape from chamber 47 to cause an unbalance of forces at the opposite ends of piston valve 42 and it will move away from seat 45, permitting fluid to flow from chamber 30 through passage 30a and port 49a to the interior of piston 21.

When fluid pressure in chamber 30, and consequently at the inlet side of valve 44, drops sufficiently, spring 43 will move piston 41 and piston valve 42 downwardly to seat valve 44. Pressure will then start to increase again in chamber 30. It will be obvious that valve 44 may not actually engage the seat since the pressure changes may be slight and occur at such a rate that the pressure in chamber 30 will be maintained substantially at a predetermined value.

As an example, assume that it is desired to maintain a reference, or control, pressure of 200 p.s.i. in chamber 30. To secure this result, a predetermined area ratio of piston 42, on the side having chamber 47, to the effective area of valve 44, is selected, for example 5:1. With this ratio, 200 p.s.i. in chamber 30 and applied to valve 44 will be balanced by 40 p.s.i. in chamber 47 and valve 44 will remain closed. The force of spring 43 will have to be such that it will resist movement of piston 41 far enough to uncover port 49 until the pressure in chamber 47 starts to exceed 40 p.s.i.

Pressure bled off through the opening 49 and port 49a is relieved from the interior of the housing 10 through a bore 50 in a central piston guide member 51. This piston guide member 51 is intimately engaged by a central bore portion 52 in the piston 25, which is free to move longitudinally of said piston guide member 51.

Operation of the modulating and shutoff valve is substantially as follows:

As an example, pressure at the inlet of the presently disclosed pressure regulating and shutoff valve may be substantially above 200 p.s.i. This pressure exists upstream of the valve element 14 in the passage bore 12. When the solenoid pilot valve 33 is in its normally closed position, the element 37 thereof prevents flow of pressure from the passage bore 12 to the chamber 30, and under this condition the spring 27 holds the piston 25 against its stop 26, while the opposite end of the spring 27 holds the piston 21 against a stop 53. Correspondingly, the link 17 holds the butterfly element 14 in a closed position with respect to the sleeve 13. Since there is substantially no flow through the valve 14, there is no substantial pressure in the passage 12 downstream of the valve element 14 and, therefore, no substantial pressure may be conducted to the chamber 31 via the tube 32.

When the solenoid element of the pilot valve 33 is energized, the valve element 37 is removed from its seat, permitting flow of pressure fluid through the opening 34 and tube 38 into the chamber 30. As soon as pressure in the chamber 30 exceeds the pressure surrounding the device, sufficiently to overcome the force of spring 27, the piston 21 will be forced toward the piston 25 and into engagement therewith at the abutment portions 28 and 29. Movement of piston 21 in this manner causes full opening movement of the valve 14 relative to the sleeve 13. Immediately pressure increases downstream of the valve element 14 and is conducted to the chamber 31, via tube 32, where it exerts a downward force on piston 25. Since the pistons 21 and 25 have previously been engaged with one another by the pressure in chamber 30 they will function as a single actuating piston.

When the pressure in chamber 31 starts to exceed that in chamber 30 there will be an unbalance of forces at the ends of the actuating piston and it will move downwardly causing the valve 14 to move toward a closed position. When pistons 21 and 25 are abutted at their portions 28 and 29 they retain the spring 27 in compressed condition and totally inoperative with respect to the modulating operations of the valve 14.

It will be observed that the piston 21 is subject, at portion 21a, to downstream pressure, the force of which is substantially canceled by the pressure applied to a corresponding area of the upper end of piston 25. Pistons 21 and 25 are of such size as to cause actuation of the valve element in a desired manner.

Reference pressure in the chamber 30 is regulated by means of the poppet valve 44 and the pressure regulating piston 41 downstream of the orifice 36, as hereinbefore described, so that pressure in the chamber 30 is constant, regardless of variations of pressure above the selected reference pressure in the passage 12 upstream of the valve element 14. The valve element 14 referred to herein constitutes the main valve element of the pressure regulating and shutoff valve according to the present invention.

It will be understood that the modulating actuator device of the present invention may be operated according to a fluid pressure differential, and may be utilized to actuate devices other than valves as disclosed herein.

I claim:

1. In a modulating and shutoff valve, the combination of: housing means forming a flow passage; a main valve element disposed to control flow through said passage; a first movable member connected to said main valve element and responsive to fluid pressure to move the valve toward an open position; a second movable member responsive to pressure to move said main valve element toward a closed position; means for applying force to said first and second movable members to move them apart and cause said main valve element to move toward a closed position; first and second chamber means disposed to receive fluid pressure and apply the same to said first and second movable members to urge them toward each other; a first conduit supplying reference pressure to said first chamber means and said first movable member; and a second conduit establishing communication between said passage at the downstream side of said valve and of said second chamber means, pressure variations in said second chamber means above and below said reference pressure serving to shift said movable members to actuate said main valve element.

2. In a modulating and shutoff valve, the combination of: means forming a flow passage; a main valve element disposed to control flow therethrough; a first movable member connected to said main valve element and responsive to fluid pressure to move said main valve element toward an open position; a second movable member responsive to fluid pressure to move said main valve element toward a closed position; resilient means between said first and second movable members tending to force them apart and move said main valve element toward a closed position; first and second chamber means disposed to receive fluid pressure and apply the same to said first and second movable members to urge them toward each other; a first conduit supplying reference pressure to said first chamber means and said first movable member; and a second conduit establishing communication between said second chamber means and said passage downstream of said main valve element, pressure variations in said second chamber means above and below said reference pressure serving to shift said movable members to actuate said main valve element.

3. In a modulating and shutoff valve, the combination of: means forming a flow passage; a main valve element disposed to control flow therethrough; a first movable member connected to said main valve element and responsive to fluid pressure to move the main valve element toward open position; a second movable member responsive to fluid pressure to move said main valve toward closed position; stop means for said second movable member to limit movement thereof in a direction away from said first movable member; spring means between said first and second movable members tending to force them apart and normally tending to move said main valve element toward a closed position relative to said flow passage; first and second chamber means disposed to receive fluid pressure and apply the same to said first and second movable members to force said movable members toward each other; a first conduit supplying reference pressure to said first chamber means and said first movable member; and a second conduit establishing communication between said second chamber means and said passage downstream of said main valve element, pressure variations in said second chamber means relative to said reference pressure serving to shift said movable members to actuate said main valve element.

4. In a modulating and shutoff valve, the combination of: means forming a flow passage; a main valve element disposed to control flow therethrough; a first movable member connected to said main valve element and responsive to fluid pressure to move the same toward open position; a second movable member responsive to fluid pressure to move said main valve element toward closed position; resilient means between said first and second movable members tending to force them apart and normally tending to actuate said main valve element toward a closed position relative to said flow passage; first and second chamber means opposed to each other and disposed to receive and apply fluid pressure to said first and second movable members respectively to force said movable members toward each other; a bleedoff pressure regulator carried by said first movable member and disposed to control reference pressure in said first chamber means; a first conduit communicating with said flow passage upstream of said main valve member and supplying reference pressure to said first chamber means and said first movable member; and a second conduit communicating with said second chamber means and said second movable member, said second conduit also communicating with pressure in said passage downstream of said main valve element.

5. In a modulating and shutoff valve, the combination of: means forming a flow passage; a main valve element disposed to control flow therethrough; a first pressure responsive movable member connected to said main valve element and responsive to fluid pressure to move said main valve toward an open position; a second pressure responsive movable member responsive to fluid pressure to move said main valve element toward a closed position spring means between said first and second movable members tending to force them apart and move said main valve element toward a closed position relative to said flow passage; first and second chamber means opposed to each other and disposed to receive and apply fluid pressure to said first and second movable members respectively to force said movable members toward each other; a bleedoff pressure regulator carried by said first movable member and disposed to control reference pressure in said first chamber means; a first conduit communicating with said flow passage upstream of said main valve member and supplying reference pressure to said first chamber means and said first movable member; a second conduit communicating with said second chamber means and said second movable member, said second conduit also communicating with pressure in said passage downstream of said main valve element; and a shutoff pilot valve in said first conduit to control flow of pressure therethrough and to thereby initiate opening and closing operation of said main valve member.

6. In a modulating and shutoff valve, the combination of: housing means forming a flow passage; a main valve element disposed to control flow therethrough; a first pressure responsive movable member connected to said main valve element and disposed to move the same toward open position; a second pressure responsive movable member for moving said valve element toward closed position; yieldable means producing a force between said first and second movable members tending to move them apart and close said main valve element; first and second chamber means disposed to receive and apply fluid pressure to said first and second movable members to urge the same toward each other and render said yieldable means ineffective to move said main valve element; abutment means on said first and second movable members to limit movement thereof toward each other and provide unitary operation thereof; a first conduit supplying reference pressure to said first chamber means and said first movable member; and a second conduit establishing communication between said second chamber means and said passage downstream of said main valve element, pressure variations in said second chamber means above and below a predetermined value serving to shift said movable members to actuate said main valve element.

7. In a modulating and shutoff valve, the combination of: means forming a flow passage; a main valve element disposed to control flow therethrough; a first movable member connected to said main valve element and responsive to fluid pressure to move the same toward open position; a second pressure responsive movable member responsive to fluid pressure to move said main valve element toward closed position; spring means between said first and second movable members to force them apart and move said main valve element toward a closed position relative to said flow passage; first and second chamber means opposed to each other and disposed to receive and apply fluid pressure to said first and second movable members respectively to force the same toward each other; abutment means on said first and second movable members to limit movement thereof toward each other and provide unitary operation thereof; a bleedoff pressure regulator carried by said first movable member and disposed to control reference pressure in said first chamber means; a first conduit communicating with said flow passage upstream of said main valve member and supplying reference pressure to said first chamber means and said first movable member; and a second conduit establishing communication between said second chamber means and said passage downstream of said main valve element.

8. In a modulating fluid pressure actuator, the combination of: a first member disposed to be moved in one direction by fluid pressure; a second member disposed for movement in the opposite direction by fluid pressure; resilient means tending to move said first and second movable members apart and effect operation thereof; first and second chamber means disposed to receive and apply fluid pressure to said first and second movable members to urge said movable members toward each other and render said resilient means ineffective; means on said members disposed for interengagement to limit movement thereof toward one another and provide for movement in unison; a first conduit supplying reference pressure to one of said chamber means and one of said movable members; and a second conduit communicating with the other of said chamber means and the other of said movable members, said second conduit being disposed to communicate with a source of pressure, whereby a differential between said reference pressure and that of said source causes unitary movement of said movable members when said resilient force is overcome by pressures in both of said chamber means.

9. In a valve, the combination of: housing means forming a fluid passage having inlet and outlet ends; a valve element disposed for movement in said passage to control fluid flow therethrough; means tending to urge said valve element toward a predetermined position; additional means disposed for movement in said housing; and passage means for applying outlet pressure to a portion of said additional means to urge said valve element toward a closed position, said additional means being responsive to fluid pressure to render said urging means ineffective, said additional means and said urging means being movable as a unit in response to a differential in fluid pressures applied to opposed portions of said additional means to impart modulating movement to said valve element.

10. In a valve, the combination of: housing means forming a fluid passage having inlet and outlet ends; a valve element disposed for movement in said passage to control fluid flow therethrough; resilient means in said housing tending to urge said valve element toward a predetermined position; additional means disposed for movement in said housing; and passage means for applying outlet pressure to a portion of said additional means to urge said valve element toward a closed position, said additional means being responsive to fluid pressures applied to opposed portions thereof to render said resilient means ineffective, said additional means and said resilient means being further responsive to a differential in fluid pressures applied to such opposed portions to move as a unit to impart modulating movement to said valve element.

11. In a valve, the combination of: housing means forming a fluid passage with inlet and outlet ends; a valve element disposed for movement in said passage to control fluid flow therethrough; means disposed for movement in said housing and connected with said valve element to impart movement thereto, said means including first and second relatively movable parts; resilient means between said parts, said resilient means tending to separate said parts and move said valve element toward a closed position; and means for applying fluid under pressure from the inlet end of said passage to said first part to move said valve toward open position and from the outlet end of said passage to said second part to move said valve toward closed position, said fluid pressure moving said parts to render said resilient means ineffective, the simultaneous application of different pressures to said parts serving to impart flow modulating movement to said valve element.

12. In a valve, the combination of: housing means forming a fluid passage with inlet and outlet ends; a valve element disposed for movement in said passage to control fluid flow therethrough; means disposed for movement in said housing and connected with said valve element to impart movement thereto, said means including first and second relatively movable parts; resilient means between said parts, said resilient means tending to move said valve element toward a closed position; means for applying fluid pressure from the inlet end of said valve to said first part to urge said valve toward an open position; means for applying fluid pressure from the outlet end of said passage to said second part to urge said valve toward a closed position, movement of said parts in response to said pressures serving to render said resilient means inoperative; and regulating means for stabilizing the pressure applied to said first part, variations in pressure applied to said second part serving to move said parts as a unit and cause flow modulating action of said valve element.

13. In a valve, the combination of: housing means forming a fluid passage with inlet and outlet ends; a valve element disposed for movement in said passage to control fluid flow therethrough; means disposed for movement in said housing and connected with said valve element to impart movement thereto, said means including first and second relatively movable parts; resilient means between said parts, said resilient means tending to move said valve element toward a closed position; means for applying fluid pressure from the inlet end of said passage to said first part to urge said valve toward an open position; means for applying fluid pressure from the outlet end of said passage to said second part to urge said valve toward a closed position, movement of said parts in response to said pressure serving to render said resilient means inoperative; pressure regulating means communicating with one of said fluid applying means to stabilize the pressure applied to said first part, variations in pressure applied to said second part serving to move said parts as a unit and cause flow modulating action of said valve element; and a shutoff valve in said fluid pressure applying means.

14. In a valve, the combination of: housing means forming a fluid passage with inlet and outlet ends; a valve element disposed for movement in said passage to control fluid flow therethrough; resilient means in said housing tending to urge said valve element toward a predetermined position; additional means having a plurality of parts disposed for movement in unison in said housing to impart flow modulating movement to said valve element, said parts being operatively engaged with said resilient means and relatively movable in response to fluid pressure to render said resilient means ineffective; means for applying a reference pressure to said additional means to urge said valve element toward an open position; means for applying fluid at the pressure in the outlet end of said passage to said additional means to urge said valve element toward a closed position; and pressure regulating means communicating with the interior of said housing to determine said reference pressure.

References Cited in the file of this patent

UNITED STATES PATENTS

| | | |
|---|---|---|
| 934,083 | Mills | Sept. 14, 1909 |
| 2,027,762 | Becker | Jan. 14, 1936 |
| 2,328,279 | Jones | Aug. 31, 1943 |
| 2,366,596 | Clifton | Jan. 2, 1945 |
| 2,741,263 | Spencer | Apr. 10, 1956 |